United States Patent Office 2,883,397
Patented Apr. 21, 1959

---

2,883,397

GAMMA-GLYCIDOXYPROPYL-BIS(TRIMETHYL-SILOXY)-METHYL SILANE

Donald L. Bailey, Snyder, N.Y., assignor to Union Carbide Corporation, a corporation of New York No Drawing. Application December 17, 1957
Serial No. 703,260

1 Claim. (Cl. 260—348)

This invention relates to a novel organosilicon compound. More particularly, the invention contemplates the provision of the specific organosilicon compound, gamma-glycidoxypropyl-bis(trimethylsiloxy)methylsilane, as represented by the following structural formula:

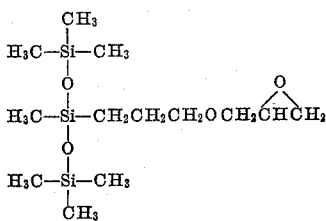

The invention is based on my discovery that the foregoing siloxane-epoxy structure can be synthesized by the thermal addition of heptamethyltrisiloxane $$[Me_3SiO)_2Si(Me)H]$$

to allyl glycidyl ether

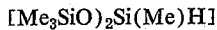

in the presence of a platinum catalyst. In essence, the synthesis involves the formation of a reaction mixture comprising the heptamethyltrisiloxane, allyl glycidyl ether, and a small amount of a platinum catalyst, followed by heating of the reaction mixture to cause the components to react under influence of the platinum catalyst to effect decomposition of the silanic hydrogen bond of the heptamethyltrisiloxane and addition of the resulting silyl and hydrogen free radicals to respective carbon atoms of the carbon to carbon multiple bond of the unsaturated epoxy ether, with the production of the desired compound as an adduct of the component reactants.

The starting material heptamethyltrisiloxane employed in synthesizing the novel compound of my invention may be produced by any one of several conventional procedures. Thus, it can be produced, for example, by the sulfuric acid catalyzed rearrangement of methylhydrogenpolysiloxane [(MeSiHO)$_x$] with hexamethyldisiloxane [Me$_3$SiOSiMe$_3$] as an endblocker. This equilibration may be accomplished by simply stirring the reactants at room temperature (25° C.) for a period of from four to eight hours in the presence of from 0.5 to 1 percent by weight of sulfuric acid, followed by suitable known measures for effecting catalyst removal.

The platinum catalyst used in promoting addition of the heptamethyltrisiloxane to the unsaturated epoxy ether, is preferably employed in finely-divided form, either alone, or in combination with an inert support such as charcoal, and the like, or in the form of a multi-component or heterogeneous catalyst consisting of platinum deposited on the gamma-allotrope of alumina (platinum-on-gamma-alumina).

It is found that the relative concentration of platinum employed for catalyzing the addition reaction is not overly critical, but rather, concentrations of the elemental metal ranging from 0.001 percent to about 5 percent by weight of the reactants can be employed and satisfactory results are obtained. In actual practice employing the metal in the form of the heterogeneous catalyst, platinum-on-gamma-alumina, I have found that concentrations of the order of one to two percent by weight of the heterogeneous substance, containing one to two percent by weight of elemental platinum, function admirably for the purpose intended.

In general, the reaction time and temperature of reaction are also relatively non-critical, and the reaction can be brought to completion with good yields of the adduct by heating the reactants at temperatures within the range 80–180° C. for periods ranging from one to three hours. In actual practice, I prefer to operate at temperatures within the range 140–160° C. It is relatively essential, however, to effect stirring or agitation of the reaction mixture throughout the time of treatment in order to establish and maintain uniform dispersion of the solid catalyst within the liquid reaction phase.

The presence of the epoxy group within the compound of the invention renders it particularly useful for purposes of introducing silicon functional members into epoxy resins and other organic systems. In addition, the presence of a polar group within the compound makes the compound a useful modifier for use in silicone elastomers or thermo-setting resins to contribute greater strength, greater cohesive and adhesive forces in bonding to other materials, greater solvents resistance, etc. The polar group further permits utilization of the compound to impart greater lubricity to silicon oils, whereas the relatively long hydrocarbon chain of the ether substituent may be used to good advantage to give silicone oils and polymers greater compatibility with organic oils or polymers. The compound, per se, is useful as a silicone oil, and may be employed, also, to introduce the functional ether and epoxy groups into siloxanes, in general, by conventional equilibration techniques.

It is believed that the invention may be best understood by reference to the following specific example describing the foregoing principles and procedures as applied to the production of the novel compound of the invention:

EXAMPLE

*Preparation of gamma-glycidoxypropyl-bis(trimethylsiloxy)-methylsilane*

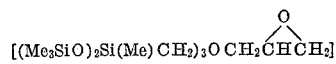

*by addition of heptamethyltrisiloxane to allyl glycidyl ether*

Into a one-liter flask equipped with stirrer and reflux condenser, there were charged 122.1 grams (0.55 mole) of (Me$_3$SiO)$_2$SiMeH, 57 grams (0.5 mole) of

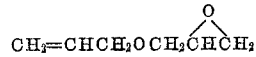

and 1.8 grams of one percent platinum-on-gamma-alumina catalyst. The mixture was heated with stirring at 150° C. for two and one-half hours. It was thereafter cooled to room temperature and filtered to remove the catalyst. The crude products were stripped to 120° C. at 0.5 mm., yielding 160 grams of volatile products. Fractionation of these products yielded 95 grams (56.5 mole-percent yield) of the desired adduct. The compound yielded the following physical and analytical data:

Boiling point _____ 94–98° C./0.2 mm.
Refractive index ($n_D^{25}$) _____ 1.4200.

|  | Percent O | Percent Si | Percent H | Epoxy Equiv. |
|---|---|---|---|---|
| Found | 46.2 | 24.8 | 9.5 | 3.5 |
| Theoretical | 46.4 | 25.0 | 9.2 | 3.6 |

Having thus described the subject matter of my invention, what it is desired to secure by Letters Patent is:

Gamma - glycidoxypropyl-bis(trimethylsiloxy)methylsilane.

No references cited.

UNITED STATES PATENT OFFICE
Certificate of Correction

Patent No. 2,883,397                                           April 21, 1959

Donald L. Bailey

It is hereby certified that error appears in the printed specification of the above numbered patent requiring correction and that the said Letters Patent should read as corrected below.

Column 1, line 36, the formula should appear as shown below instead of as in the patent:

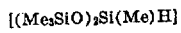

column 2, lines 57 to 59, the formula should appear as shown below instead of as in the patent:

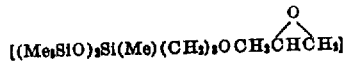

Signed and sealed this 3rd day of May 1960.

[SEAL]

Attest:
KARL H. AXLINE,
*Attesting Officer.*

ROBERT C. WATSON,
*Commissioner of Patents.*